Nov. 21, 1972    J. JACQUELIN    3,703,416
BASIC CELL OPERATING WITH HYDROCARBON FUEL
Filed Sept. 29, 1970
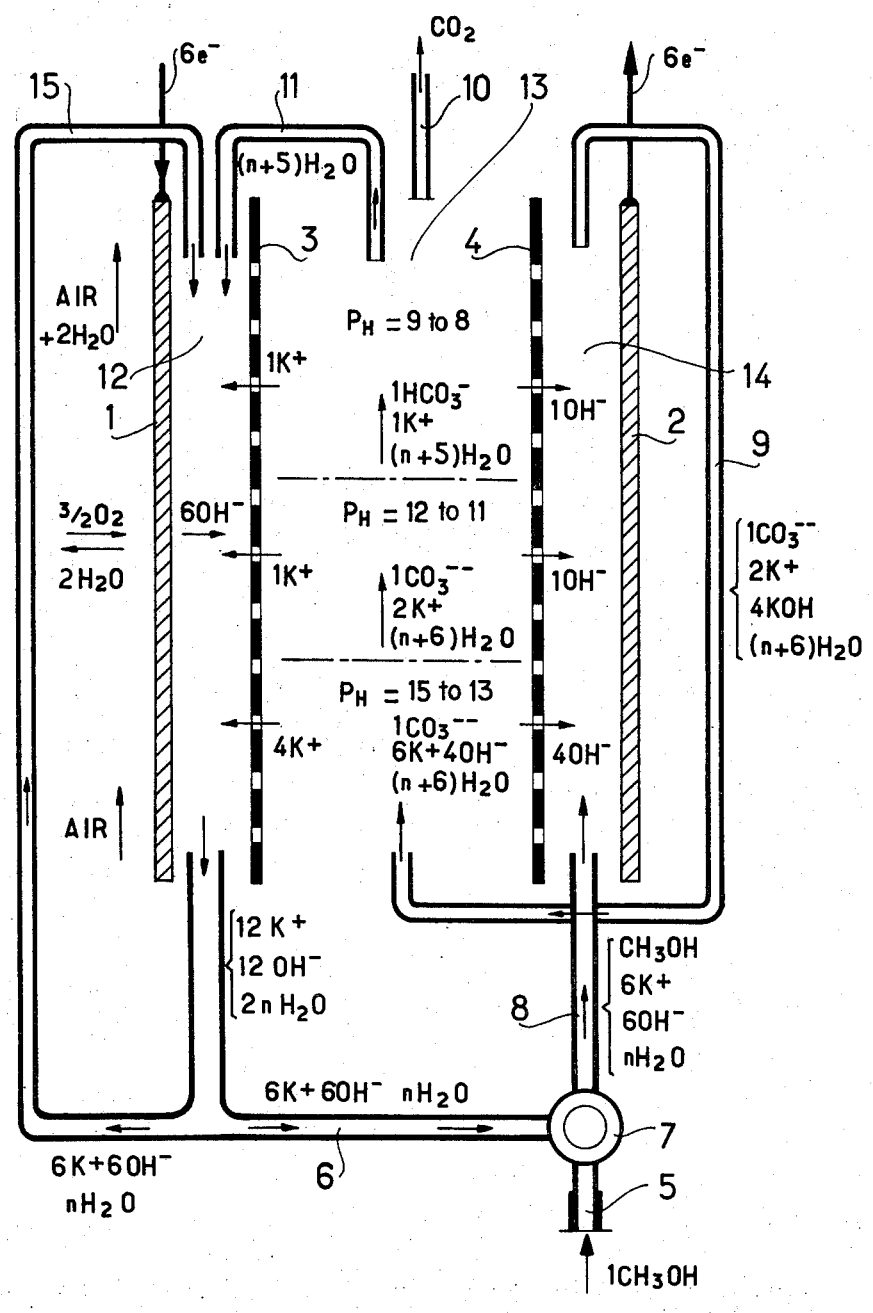

United States Patent Office 3,703,416
Patented Nov. 21, 1972

3,703,416
BASIC CELL OPERATING WITH HYDROCARBON FUEL
Jean Jacquelin, Lapoitevine, France, assignor to Compagnie Generale d'Electricite, Paris, France
Filed Sept. 29, 1970, Ser. No. 76,511
Claims priority, application France, Sept. 29, 1969, 6933153
Int. Cl. H01m 27/00
U.S. Cl. 136—86 R      3 Claims

ABSTRACT OF THE DISCLOSURE

Basic cell with hydrocarbon fuel, in which a decarbonization of the electrolyte is carried out.

It comprises two diaphragms respectively anodic and cathodic which insulate a central compartment wherein there locally appears a pH value sufficiently low to give rise to a carbon dioxide emission.

The invention may be used for fuel cells having a high overall energetic yield.

BACKGROUND OF THE INVENTION

Field of the invention

The present invention concerns a fuel cell operating with an alkaline electrolyte and a hydrocarbon fuel, for example, methanol.

Description of the prior art

It is known that in fuel cells operating with an alkaline electrolyte utilizing air as a combustion-assisting agent and methanol as fuel, the presence of carbon dioxide is troublesome because it causes carbonization of the electrolyte. Carbon dioxide on the one hand is present in the air fed to one of the electrodes and on the other hand is a by-product of the oxidizing reactions of the methanol, and it must therefore be eliminated. This may be done by adding a base such as lime in order to create insoluble carbonates, but such a method requires complex and bulky additional members. It is also possible to proceed by electrodialysis. Thus, a known method consists in effecting a dialysis outside the cell, there being provided in an electrolysis cell outside the fuel cell proper a cationic membrane which separates the anode and cathode compartments. The cations $K^+$ of the potassium carbonate solution extracted from the cell pass through the cationic membrane under the action of an electric field which is specially set up between the electrodes, and the carbon dioxide harmful to the operation of the cell is collected on the anode. However, this method consumes a considerable proportion of the energy produced by the cell and necessitates the use of additional members outside the cell proper.

Another method consists in effecting a dialysis within the cell. For this purpose, the cell is separated by a cationic membrane into two compartments, in which the concentrations vary in different manners during the operation. In the cathode compartment, the base concentration is increased, while it is decreased at the same time in the anode compartment. Consequently, the pH of the solution of the anode compartment decreases, and when it reaches a value in the neighborhood of 8, the carbon dioxide starts to evolve.

The application of this latter method therefore involves the use of a catalyst which is capable of operating at pH values of more than 8 up to pH values in the neighborhood of 14.

However, the majority of catalysts at present known cannot withstand such low pH values without being detrimentally affected thereby. There are exceptions, but in such cases only a very weak current is obtained at the low pH values.

The present invention makes it possible to obviate the aforesaid disadvantages.

SUMMARY OF THE INVENTION

It concerns a fuel cell operating with an alkaline electrolyte in which the electrolyte compartment bounded by the electrodes is divided by means of a cationic membrane, characterized by the fact that an anionic membrane is disposed between the aforesaid cationic membrane and the anode so as to create a central compartment in which the pH of the electrolytic solution is reduced to a value such that the carbon dioxide is evolved in gaseous form, the pH value in the neighborhood of the two electrodes not being substantially reduced.

DETAILED DESCRIPTION OF THE PREFERRED EMBODIMENTS

In accordance with another feature of the invention, a carbon fuel is introduced into the compartment bounded by the anionic membrane and the anode, or the anode compartment, the electrolyte penetrating into the said anode compartment being thereafter reinjected into the central compartment, and the electrolyte which penetrates into the compartment bounded by the cationic membrane and the cathode, or the cathode compartment, thereafter being reinjected, preferably in combination with the carbon fuel, in the anode compartment.

In a fuel cell according to the invention, it is possible to effect a continuous decarbonization, for example for more than 100 hours, without the catalyst present in the electrode being impaired.

There will be described in the following, with reference to the diagrammatic drawing, an example of the application of the present invention, which is given purely by way of illustration and has no limiting character.

The accompanying drawing very diagrammatically illustrates the case of a methanol-air cell in which there are disposed between an air electrode (cathode) 1 and a fuel electrode (anode) 2 situated about 1–5 millimeters apart two semi-permeable membranes 3 and 4, which are cationic and anionic respectively. The cationic membrane 3 may be a membrane of Ionac Chemical Co., known under the reference MC 3470. The anionic membrane 4 may be a membrane supplied by the aforesaid company and known under the reference MC 3475. The electrodes and the membranes thus form a cationic compartment 12, a central compartment 13 and an anode compartment 14.

The electrolyte employed is potassium hydroxide of 6 N concentration.

A mixer 7 receives the methanol supplied through a duct 5 and the potassium hydroxide diluted in water, which comes from the cationic compartment 12 through a duct 6. The mixture is injected through a duct 8 into the anode compartment 14. The central compartment 13 bounded by the cationic and anionic membranes 3 and 4 respectively receives through the pipe 9 a partially carbonated potassium hydroxide solution coming from the anode compartment. The carbon dioxide $CO_2$ escapes from the central compartment in the direction 10. A pipe 11 is provided for the passage of the water from the central compartment 13 to the cathode compartment 12. If desired, it is possible to recover some of the potassium hydroxide emanating from the cathode compartment 12 in order to return it to the top of the latter through the duct 15.

The operation of the process may be explained by the following reactions:

At a pH of 15–13, the following reaction occurs:

$$CH_3OH + 8OH^- \rightarrow CO_3^{--} + 6H_2O + 6e^-$$

At a pH of 12–11, the carbonate ion is converted into a bicarbonate ion under the influence of the lowering of the extent of basicity taking place locally in the central compartment, and we obtain:

$$CO_3^{--} + H_2O \rightarrow HCO_3^- + OH^-$$

At a pH of 9–8, the bicarbonate ion $HCO_3^-$ is decomposed into carbon dioxide in the zone in which the pH falls to between 9 and 8, and we obtain:

$$HCO_3^- \rightarrow CO_2 + OH^-$$

It is to be noted that the schematic cell described in the foregoing, which has different pH zones, must be subdivided into a series of elemental cells disposed end-to-end.

The form of construction of the cell according to the invention as described and illustrated has been referred to only as an example having no limiting character. It is obvious that details may be modified and certain means replaced by other equivalent means without departing from the scope of this invention.

What is claimed is:

1. A fuel cell containing an alkaline hydroxide electrolyte having a first compartment, a second compartment, and a central compartment between said first and second compartments; these compartments being formed of the following elements disposed in the fuel cell in contact with said electrolyte:

said second compartment being defined by a cathode and a cationic membrane;

said first compartment being defined by an anionic membrane and an anode, said anode being spaced from said anionic membrane on the side of said anionic membrane opposite the side of said anionic membrane which faces said cationic membrane;

said central compartment being defined between said cationic membrane and said anionic membrane, said anionic membrane being spaced from said cationic membrane on the side of said cationic membrane opposite the side which faces said cathode;

and these compartments being in continuous fluid flow relationship during operation in the following manner:

outlet means connecting said first compartment and the bottom portion of said central compartment to transfer said electrolyte from said first compartment to said central compartment;

outlet means connecting the top of said central compartment with the top of said second compartment to transfer water from said central compartment to said second compartment;

outlet means connecting the bottom of said second compartment with said first compartment to transfer electrolyte from said second compartment to said first compartment;

the pH of said alkaline electrolyte in said central compartment being reduced to a value such that carbon dioxide is evolved in gaseous form, the pH of the solution adjacent said electrodes not being substantially reduced, and means to introduce a carbon fuel into said first compartment.

2. A fuel cell according to claim 1 including means for recycling a portion of the electrolyte which exits from the bottom of said second compartment into the top of said second compartment.

3. A fuel cell as in claim 1 wherein said means for transferring the electrolyte into said first compartment is combined with means to introduce a carbon fuel into said first compartment.

References Cited
UNITED STATES PATENTS 3,511,712  5/1970  Giner _____ 136—86 R
3,519,488  7/1970  Giner _____ 136—86 C WINSTON A. DOUGLAS, Primary Examiner H. A. FEELEY, Assistant Examiner